US006199287B1

United States Patent
Rankila

(10) Patent No.: US 6,199,287 B1
(45) Date of Patent: Mar. 13, 2001

(54) PARKING GUIDE

(76) Inventor: Chris Rankila, 5073 Anderson Rd., Hermantown, MN (US) 55811

( * ) Notice: Subject to any disclaimer, the term of this patent is extended or adjusted under 35 U.S.C. 154(b) by 0 days.

(21) Appl. No.: 09/190,926

(22) Filed: Nov. 12, 1998

(51) Int. Cl.[7] ................................................. G01C 15/00
(52) U.S. Cl. ........................................... 33/286; 116/28 R
(58) Field of Search ............................. 33/227, 262, 263, 33/264, 276, 277, 286, 533; 116/28 R, 35 R

(56) References Cited

U.S. PATENT DOCUMENTS

| | | | |
|---|---|---|---|
| 4,222,175 | * | 9/1980 | Bernicky ................................ 33/286 |
| 4,257,706 | | 3/1981 | Smith ..................................... 33/264 |
| 4,583,481 | * | 4/1986 | Garrison ............................. 116/28 R |
| 4,813,758 | * | 3/1989 | Sanders .............................. 116/28 R |
| 5,189,801 | | 3/1993 | Bergfield ................................ 33/264 |
| 5,890,299 | * | 4/1999 | Giordano ............................... 33/263 |
| 5,992,343 | * | 11/1999 | Drover ................................ 116/28 R |

FOREIGN PATENT DOCUMENTS

| 372014 | * | 9/1920 | (DE) ...................................... 33/286 |
|---|---|---|---|
| 1276392 | * | 6/1972 | (GB) ...................................... 33/286 |

* cited by examiner

Primary Examiner—G. Bradley Bennett
(74) Attorney, Agent, or Firm—Patterson, Thuente, Skaar & Christensen, P.A.

(57) ABSTRACT

A spatial orientation guide used to enable a person to easily, accurately, and repeatedly return to a predetermined location. The guide comprises two similarly shaped, contrasting portions each defining a similarly shaped outline on separate, adjacent planes. To set the guide for future use, a suitable location is chosen. The guide is then positioned so that the planar outlines of the portions are orthogonal to and spaced along the sight line taken from the chosen location. In this configuration, the portion closest to an observer obscures the maximum observable surface area of the portion furthest from an observer. When the person wants to return to the desired location, all that is required is that the person move relative to the now "set " guide. As a person moves toward and away from the predetermined location, the percentage of the observable surface area of the furthermost portion becomes lesser and greater, respectively. When the amount of observable surface area of the furthermost portion is at a minimum or disappears, the user is at the predetermined location.

18 Claims, 2 Drawing Sheets

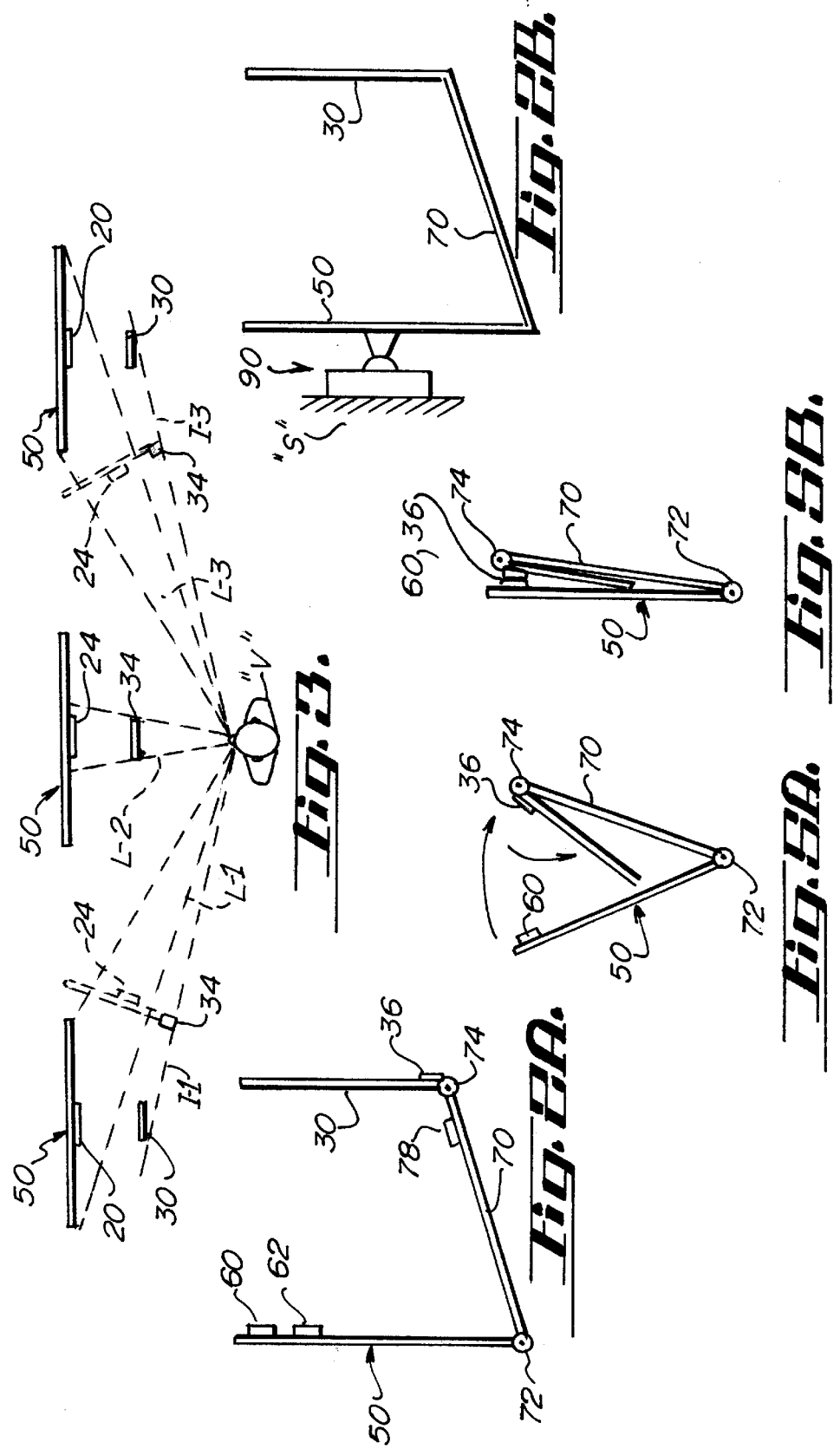

PARKING GUIDE

FIELD OF THE INVENTION

The present invention is generally related to a spatial reference guide and, more particularly, to a vehicle parking guide used to position a vehicle at a predetermined location.

BACKGROUND OF THE INVENTION

When parking a vehicle such as a car in a garage, it is often difficult to precisely or accurately gauge distances, particularly the space between a bumper and a wall. This inability to accurately gauge distances can lead to adverse results, such as damage to the vehicle or the garage, impingement into walkways, and interference with storage space, to name a few. One method of avoiding such results is to enlist a spotter to assist in parking the vehicle. This method works when a spotter is available, however, there are many instances when a spotter is not available to provide such assistance. Consequently, attempts have been made to provide devices which enable a single person to accurately and precisely position a vehicle within a garage. One example, U.S. Pat. No. 4,257,706, issued to Smith, Mar. 24, 1981, discloses a motor vehicle back-up limit gauging method and apparatus. This apparatus enables a driver of a vehicle to gauge distances when backing-up. The apparatus includes a pair of sights which are attached to the vehicle. These sights are then used by aligning them with the ground line of a wall or with another marker. Alignment is accomplished by viewing the sights through a side-view mirror. This apparatus has several drawbacks. It is only useful when a vehicle is being driven in reverse. It requires additional structure to be added to the side of a vehicle. It also requires a great deal of skill to use. Another example, U.S. Pat. No. 4,813,758, issued to Sanders Mar. 21, 1989, discloses a vehicle parking guide. This guide enables a driver to position a vehicle within a garage. The guide is positioned at an end wall of a garage so that it faces the garage door. It comprises lateral positioning members and a longitudinal positioning member. The lateral positioning members comprise lateral positioners which are offset from each other. Alignment of the lateral positioning members indicates that the operator of a vehicle is in the correct lateral position within a garage. Longitudinal alignment is indicated by the reflection of a headlight in a driver's eyes. This guide has several drawbacks. It must be positioned on the rear wall of a garage so that it faces the front end of an oncoming vehicle. It must be positioned above the hoodline of the vehicle. And it may be only used in front-facing parking situations. Yet another example, U.S. Pat. No. 5,189,802, issued to Bergfield, Mar. 2, 1993, discloses a vehicle parking guide. This device comprises a rotary mechanical arm which is attached to a string. As a bumper of a vehicle encroaches upon the string, the arm rotates to indicate relative positioning of the vehicle. This guide, too, has its drawbacks. The device is designed for front facing parking. It can be easily moved or dislodged, and thus lead to damage of the vehicle and/or garage. It also has many components which could be damaged, lost, or disabled.

There is a need for a spatial reference guide which can be used to assist in frontal and rearward parking of a vehicle in a structure such as a garage. There is a need for a spatial reference guide which can be positioned and effectively used in a plurality of positions and locations. Also, there is a need for a spatial reference guide which does not impinge upon a user, is not easily moved or disabled, and which does not require a great deal of skill to operate.

SUMMARY OF THE INVENTION

Accordingly, the present invention is directed to a spatial reference guide for positioning a user at a predetermined location. The reference guide includes a distal or far portion with a first surface and a proximal or near portion with a second surface. The first surface defines a first planar outline and the second surface defines a second planar outline. The distal portion is operatively connected to the proximal portion in a spaced relation therefrom so that the proximal portion is relatively closer to the predetermined location along the sight line of the predetermined location than the distal portion. The second planar outline is sized so that when the guide is viewed from a predetermined location, the second planar outline substantially obscures the first planar outline of the distal portion. In use, a variable amount of the distal portion is observable along the sight line of a user, as the user moves toward and away from the sight line of a predetermined location. When the user reaches the predetermined location, coverage or obscuring of the distal portion by the proximal portion will be at a maximum.

To facilitate use, the guide is provided with a background member with a surface which extends beyond the first planar outline of the first portion. The background surface and the proximal second surface are treated so that they contrast with surface treatment of the distal portion surface. Preferably, the background surface and the proximal second surface are provided with a relatively dark surface treatment, such as black paint; and the distal first surface is provided with a relatively lighter surface treatment. It has been found that a suitable surface treatment for the first surface is to provide it with retro-reflective material of a contrasting color (e.g. white), commercially available from Minnesota Mining and Manufacturing under the name 3M series 580 road reflective tape. However, other light emitting or light reflective materials may be used.

The guide may be attached to a suitable support by fasteners such as nails, screws, hooks, adhesives, magnets, cords, elastic bands, and the like. Alternatively, the guide may be provided with an articulation which allows movement of the guide along a plurality of axes. The articulation is preferably of the ball-and-socket type, which permits a myriad of positions. This embodiment may also be attached to a suitable support by the fasteners mentioned above.

In an alternative embodiment, the guide is provided with hinges which permit the web and the second portion to be folded relative to the first portion. This allows the guide to be compacted for transport and storage. Portions of the guide may be provided with suitable fasteners to enable the guide to be maintained in the folded state.

In another embodiment, the guide is provided with removable proximal and distal portions. The proximal and distal portion may be attached to the web and background, respectively, by appropriate fasteners such as hook-and-loop fastening elements, magnets, adhesives, mechanical elements, and the like. The distal portion and the proximal portion need not be planar. And, it is important that the first planar outline and the second planar outline, when viewed along the sight line from the predetermined location, are similarly shaped to enable the proximal portion to substantially obscure the distal portion when a user views the device from the predetermined location. The distal portion may be provided with suitable light emitting or reflecting materials.

Although the present invention intended to assist in parking a vehicle such as a car in a structure such as a garage, it may also be used in other situations. For example, to position an airplane within a hanger, to assist in docking watercraft, to assist in parking trailers, or to provide orientation of lifting mechanisms in warehouse environments. Obviously, it may be used for frontal parking as well as rearward parking.

The guide may also be used by individuals, such as hunters, to enable them to select and easily return to a predetermined location.

A plurality of guides may be used for increased spatial positioning precision. For example, one guide could be used for proximal-distal alignment, while another guide could be used for medial-lateral alignment.

Spatial positioning need not be restricted to horizontal environs. Spatial positioning in a vertical orientation may be easily achieved by rotating the guide 90° and then using in the normal fashion.

The primary object of the present invention is to provide an easy to use spatial locating and reference guide.

Another object of the present invention is to facilitate positioning of a vehicle within a structure such a garage.

Still another object of the present invention is to increase the precision of placement of an object at a desired location.

Another object of the present invention is to provide a guide which may be used in front-facing and rear-facing parking situations.

A feature of the present invention is the provision of contrasting surface treatments on the surfaces of the guide.

Another feature of the present invention is the use of reflective or light emitting material on a portion of the guide.

Another feature of the present invention is to use a proximal portion of the guide to hide or obscure a distal portion of the guide to indicate the correct predetermined location has been reached.

Another feature of the present invention is that the proximal and background surfaces have the same surface treatment.

An advantage of the present invention is that it is simple to construct.

Another advantage of the present invention is that it may be attached to a variety of surfaces.

These and other objects, features and advantages of the invention will become more readily apparent to those skilled in the art from the detailed description and the accompanying drawings.

BRIEF DESCRIPTION OF THE DRAWINGS

FIG. 2A is an edge view of the guide;

FIG. 2B is an edge view of an alternative embodiment of the guide showing attachment of the guide to a support;

FIG. 3 is a top view illustrating various apparent images as lines of sight change with respect to the guide;

FIG. 5A is an edge view of an alternative embodiment of the guide in which the guide is partially collapsed; and FIG. 5B is an edge view of the alternative embodiment of FIG. 5A in which the guide is fully collapsed.

DETAILED DESCRIPTION

Figure 1:
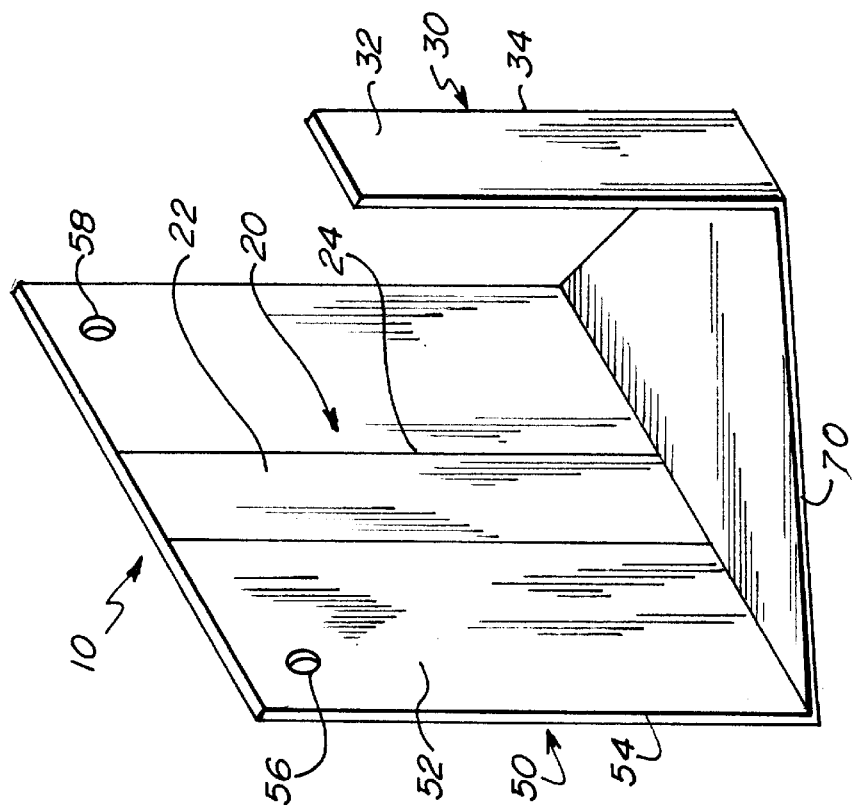
FIG. 1 is a perspective view of the guide of the present invention.

Referring to FIG. 1, the spatial reference guide is generally designated with the numeral 10. In essence, guide 10 comprises distal portions 20 and a proximal portion 30. The distal portion 20 has a first surface 22 which defines a first planar outline 24 and the proximal portion 30 has a second surface 32 which defines a second planar outline 34. Distal portion 20 is attached to a background member 40 which has a third surface 52 which defines a third outline. Background member 50 is provided with apertures 56, 58 which are configured to engage fastening elements such as nails, screws, bolts, hooks, cords, etc. (not shown). The proximal or near surface 30 is held in a spaced relation from the distal or far surface 20 by a web 70 which is attached at either end to the distal and proximal portions 20, 30.

Referring to FIG. 2A, in a second embodiment, web 70 of guide 10 is provided with hinges 72, 74 which allow the guide 10 to be folded into a compact form for transport and storage (see FIGS. 5A and 5B). To maintain the guide in a folded condition, fastening elements may be provided on the third surface 52 and the second surface 32, or the third surface 52 and the fourth surface 72, if desired. Alternatively, the guide 10 may be maintained in a folded condition by a cord or an elastic band. Fastening elements 60 and 62 are disposed on background element 50.

Referring to FIG. 2B, guide 10 may be provided with an articulation 90 to facilitate orientation of the guide 10. Articulation 90 is preferably attached to background member 50, and is of the type which allows guide 10 to move along a plurality of axes. Articulation 90 allows the guide 10 to be fine tuned to an individual user or to be positioned obliquely relative to a user. Articulation 90 may be attached to a support member "S" in any conventional manner, such as mechanical fasteners, adhesives, magnets, or the like. Alternatively, background member 50 may be provided with a shim or shims to assist in proper positioning of guide 10.

Referring to FIG. 3 a viewer "V" is positioned in three positions relative to a guide 10. In the first position, the viewer "V" is to the right of guide 10. In this position, viewer "V" has a first line of sight L1 (indicated by dashed lines) in the direction of guide 10. Due to the angle of the line of sight L1, second surface 32 of proximal portion 30 does not appear to impinge or obscure first surface 22 of distal portion 20. Rather, viewer "V" observes an apparent image I1 in which the first planar outline 24 of distal portion 20 and third planar outline 54 of background member 50 are fully viewable, though in a foreshortened or thinned relation. The equally foreshortened or thinned second planar outline 34 of proximal portion 30 will appear to the left of the apparent image I1. In the second or predetermined position, the viewer "V" is directly opposite guide 10. In this position, viewer "V" has a second line of sight L2 (indicated by dashed lines) in which second planar outline 34 of proximal portion 30 substantially obscures first planar outline 24 of distal portion 20. That is, when a viewer "V" is in the predetermined position coverage or obscural of the distal portion 20 by the proximal portion 30 is at a maximum. In the third position, the viewer "V" is to the left of guide 10. In this position, viewer "V" has a third line of sight L3 (indicated by dashed lines) in the direction of guide 10. Due to the angle of the line of sight L3, second surface 32 of proximal portion 30 does not appear to impinge or obscure first surface 22 of distal portion 20. Rather, viewer "V" observes an apparent image I3 in which the first planar outline 24 of distal portion 20 and third planar outline 54 of background member 50 are fully viewable, though in a foreshortened or thinned relation. The equally foreshortened or thinned second planar outline 34 of proximal portion 30 will appear to the right of the apparent image I3.

Figure 4:
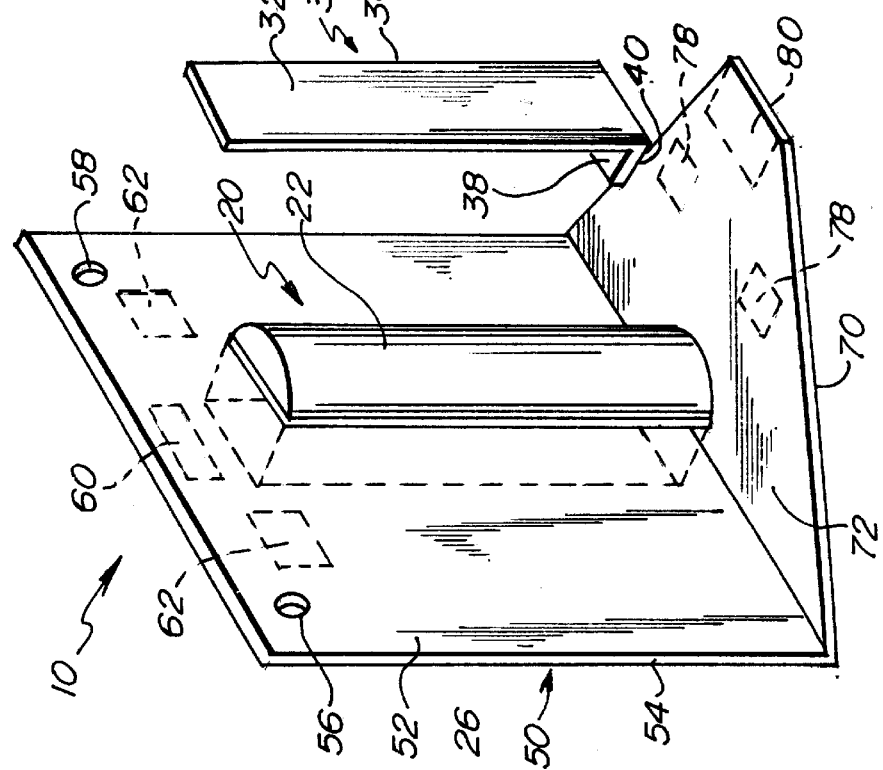
FIG. 4 is an exploded perspective view of an alternative embodiment of the guide showing portions of the guide prior to attachment to the guide.

Referring to FIG. 4, distal portion 20 and proximal portion 30 of guide 10 are removably attached to background member 50 and web 70, respectively. First, or proximal portion 20 is provided with a fastening element 26 which engages third surface 52 of background member 50 or engages another fastening element on the surface of background member 50 (not shown). Fastening element 26 may be magnetic, adhesive, or other suitable material which allows the distal portion to be attached and/or removed from the background member 50. Distal portion 20 may be non-planar and may include light emitting material, if desired. Proximal portion 30 includes a leg 38 which is provided with a fastening element 40 which engages a suitable fastening element 80 on fourth surface 72 of web 70. Fastening elements 40, 80 may be complementary such as hook-and-loop fasteners. Other suitable fasteners which allow attachment and removal of the proximal portion to the web may be used, if desired. The proximal portion may also be non-planar.

Referring to FIGS. 5A and 5B, the guide 10 is depicted as it is compacted for transport and/storage. Here, guide is provided with hinge 72 which allows web 70 to be folded relative to background member 50 and hinge 74 which allows portion 30 to be folded relative to web 70. As can be seen, background member 50 is provided with a fastening element 60. A complementary fastening element 36 may be provided on either the proximal portion 30 and/or the web 70 at 78 so that the guide 10 may be maintained in the folded or compacted state.

Although the preferred material used in fabrication of the guide is metal, it is envisioned that other materials such as plastic could be used.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

I claim:

1. A spatial reference guide for positioning a user at a predetermined location, the guide comprising:
   a. a planar distal portion, the distal portion defining a first planar outline;
   b. a proximal portion operatively connected to the distal portion by a web, the proximal portion, the distal portion, and the web having a U-shape when viewed from the side, the proximal portion defining a second planar outline, the proximal portion being relatively closer than the distal portion to the predetermined location along the sight line of the predetermined location, the second planar outline of the proximal portion being sized and positioned directly intermediate the predetermined location and the distal portion such that the distal portion is substantially obscured by the proximal portion when the guide is viewed from a sight line at the predetermined location;
      wherein an increasing amount of the distal portion is observable as the sight line of a user moves away from the sight line of the predetermined location, and
      wherein a decreasing amount of the distal portion is observable as the sight line of a user approaches the sight line of the predetermined location.

2. The guide of claim 1, wherein the guide further comprises a background member, the background member comprising the distal portion, the background member defining a third outline;
   wherein the third outline is substantially larger than the first outline.

3. The guide of claim 2, wherein the distal position has a first surface, and the proximal portion has a second surface, and the background member has a third surface, and wherein the second surface and the third surface are similarly finished, and the first surface has a contrasting surface relative to the similarly finished second and third surfaces.

4. The guide of claim 3, wherein the contrasting surface is light, relative to the similarly finished second and third surfaces.

5. The guide of claim 3, wherein the contrasting surface is reflective.

6. The guide of claim 3, wherein the first portion includes a light emitter.

7. The guide of claim 1, wherein the first portion and the second portion are adjustable relative to each other.

8. The guide of claim 1, wherein the first and second portions are planar and parallel with respect to each other.

9. The guide of claim 1, further comprising a fastener for removably attaching the guide to a support surface.

10. The guide of claim 9, wherein the fastener further comprises an articulation, the articulation permitting the guide to be selectively positioned relative to the support surface.

11. A parking guide for use in repeatably positioning a vehicle in a predetermined location, the guide comprising:
    a. a distal portion, the distal portion having a first surface, the first surface defining a first planar outline when viewed along a sight line from a predetermined location;
    b. a proximal portion, the proximal portion having a second surface, the second surface defining a second planar outline when viewed along the sight line from a predetermined location, the proximal portion being relatively closer than the distal portion to the predetermined location along the sight line of the predetermined location, the second planar outline of the proximal portion being sized to substantially obscure the first planar outline of the distal portion when the guide is viewed from a predetermined location;
    c. a web, the web operatively connecting the proximal portion to the distal portion in a U-shape,
       wherein the second planar outline is parallel to and substantially coincident with the first planar outline;
       wherein an increasing amount of the distal portion is observable as the sight line of a user moves away from the sight line of a predetermined location, and
       wherein a decreasing amount of the distal portion is observable as the sight line of a user approaches the sight line of a predetermined location.

12. The guide of claim 11, wherein the web further comprises hinges, the hinges permitting the guide to be compacted for transport and storage.

13. The guide of claim 12, further comprising a coupling for maintaining the guide in the compacted form.

14. The guide of claim 11, wherein the distal portion further comprises a background member, the background member having a third surface, the third surface defining a third outline;
    wherein the third outline is substantially larger than the first outline.

15. The guide of claim 14, wherein the second surface and the third surface are similarly finished, and the first surface has a contrasting surface relative to the similarly finished second and third surfaces.

16. The guide of claim 14, wherein the contrasting surface is light, relative to the similarly finished second and third surfaces.

17. The guide of claim 14, wherein the contrasting surface is reflective.

18. A method of using a spatial reference guide to enable a user of the guide to be repeatedly positioned in a predetermined location, the method comprising the steps of:
   a. selecting a desired spatial location;
   b. providing a spatial reference guide having:
      i. a distal portion, the distal portion having a first surface, the first surface defining a first planar outline when viewed along a sight line from a predetermined location; and,
      ii. a proximal portion operatively connected to the distal portion by a web and forming a U-shape, the proximal portion having a second surface, the second surface defining a second planar outline when viewed along the sight line from a predetermined location, the proximal portion being relatively closer than the distal portion to the predetermined location along the sight line of the predetermined location, the second planar outline of the proximal portion being sized to substantially obscure the first planar outline of the distal portion when the guide is viewed from a predetermined location; and,
   c. affixing the guide to a support so that:
      i. an increasing amount of the distal portion is observable as the sight line of a user moves away from the sight line of a predetermined location, and
      ii. a decreasing amount of the distal portion is observable as the sight line of a user approaches the sight line of a predetermined location.

\* \* \* \* \*